United States Patent [19]
Unema

[11] 3,823,313
[45] July 9, 1974

[54] LASER FANNING DEVICE
[75] Inventor: Norman P. Unema, Hudsonville, Mich.
[73] Assignee: Laser Alignment Inc., Grand Rapids, Mich.
[22] Filed: Feb. 14, 1972
[21] Appl. No.: 225,969

[52] U.S. Cl. ............ 240/44.26, 33/275 R, 240/2 R, 356/248
[51] Int. Cl. ......................................... F21v 19/02
[58] Field of Search ........ 240/2 R, 2 M, 10.1, 41 R, 240/44.26, 49, 52 R, 61, 61.11, 62, 84; 33/275 R, 292; 331/94.5 A; 356/248

[56] References Cited
UNITED STATES PATENTS

| | | | |
|---|---|---|---|
| 1,922,791 | 8/1933 | Bumpus | 33/275 R |
| 2,344,153 | 3/1944 | Leonard | 240/49 X |
| 3,279,070 | 10/1966 | Blount et al. | 33/275 R |
| 3,309,661 | 3/1967 | Kennelly | 240/49 X |
| 3,471,234 | 10/1969 | Studebaker | 331/94.5 A X |

Primary Examiner—Fred L. Braun
Attorney, Agent, or Firm—Price, Heneveld, Huizenga & Cooper

[57] ABSTRACT

A laser generator is mounted on a conventional transit for rotation about a vertical axis. A crank is interconnected at one end to the support structure of the transit and at its other end to the drive of an electric motor affixed to the transit and laser generator. Operation of the motor and crank causes rotational and reciprocal movement of the transit and generator about an axis to develop a datum plane of light. A control knob provides grade adjustment and is linked to a digital counter to provide a visual readout of the grade.

23 Claims, 4 Drawing Figures

LASER FANNING DEVICE

BACKGROUND OF INVENTION

This invention relates to a planar referencing device utilizing the projection of a highly intensified and collimated light source, and more particularly to an improved apparatus for projecting a datum plane of light and adjustment thereof.

The use of an intensified and collimated light beam such as projected by a laser generator has become widely adopted in various surveying environments such as for example grade control in digging trenches. In connection with such use, it has become desirable to project light in a plane and provide a target or sensor for intercepting the light plane. An overall drawback to present proposals however is the lack of simplicity in the devices. Present proposals are complex and therefore costly and in the end cumbersome to use. This is true not only in the projection of a plane of light, but also in the systems associated therewith for adjusting and maintaining grade accuracy. Thus, there is a need today for a laser fanning device which is simple, economical, inexpensive, and ideal for any project that requires truly accurate grade control.

SUMMARY OF INVENTION

In accordance with the invention, a highly collimated light generator such as a laser generator is mounted on a conventional transit or builders level which is mounted for rotation about an axis generally perpendicular to the line-of-sight of the transit, the light projection axis being parallel to the transits line-of-sight axis. Thus the light beam generator is rotatable with the transit. An electric motor and a crank are mounted to the transit and generator structure and to the transit support at a position offset from the axis of rotation so that operation of the motor causes the light beam to oscillate in a rotational pattern to develop a plane of light generally perpendicular to the axis of rotation.

In another aspect of the invention, the light generator is pivotally mounted to the transit support means for movement about a generally horizontal axis to provide grade adjustment. A manually operated mechanical means provides grade adjustment of the light generator and is interconnected to a counter means which provides a visual read-out of the grade. Preferably, the light generator is a laser and the adjustment means is a threaded adjustment screw and control knob.

This invention permits the utilization of a low torque motor since it is mounted at a substantial distance from the axis of rotation of the transit and generator thus taking advantage of the mechanical advantage provided thereby. Further it permits use of a substantial portion of existing and conventional structure. This permits substantial simplicity in the overall structure thereby reducing substantially the overall cost. A simple grade adjustment mechanism with a visual read-out permits less manpower and labor to both set up and adjust the mechanism.

DESCRIPTION OF THE PREFERRED EMBODIMENT

Figure 1:
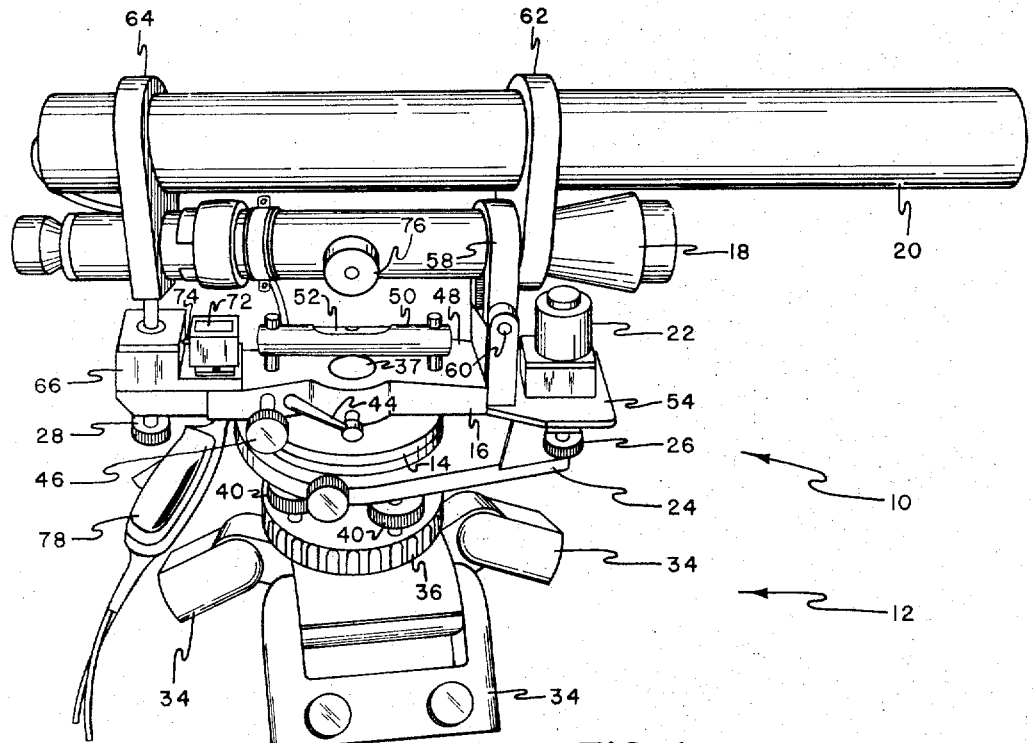
FIG. 1 is a perspective view of the laser fanning device provided by the invention.

The apparatus of this invention which will now be described in detail is used to develop a plane of light from a highly concentrated collimated light beam generator. One of the highest collimated generators presently available is that of a laser and hence the following description pertains to an apparatus utilizing a laser generator although it will be appreciated that other types of highly collimated light sources could be used.

Referring now to the drawings, the laser fanning device is generally designated by the reference numeral 10 (FIG. 1) and is generally supported by a portable support such as a conventional surveyor transit tripod 12. The device 10 is in part a conventional transit modified to produce a distinctly different mechanism and function.

The transit part includes a table or head 14 to which there is mounted a support bracket 16 rotatable relative to head 14. A conventional sighting scope 18 is mounted on support bracket 16 and a laser generator 20 is supported on scope 18 with the light beam axis of the generator aligned parallel to the line-of-sight of scope 18. An electric motor 22 is mounted on bracket 16 with its drive shaft (not shown) extending downwardly toward a support plate 24 extending from head 14. Motor 22 drives a crank arm 26 which provides oscillatory rotational movement of bracket 16 about axis A (FIG. 4) and hence laser generator 20 through arcuate limits to develop the projection of a plane of light. Scope 18 and laser generator 20 are also mounted to bracket 16 for pivotal movement on pin 60 about an axis perpendicular to the plane of the axes of the scope and generator to provide grade adjustment. A thumbscrew 28 provides a quick and easy adjustment of the grade and is interconnected to a digital counter 30 to provide a visual read-out of the grade.

Figure 2:
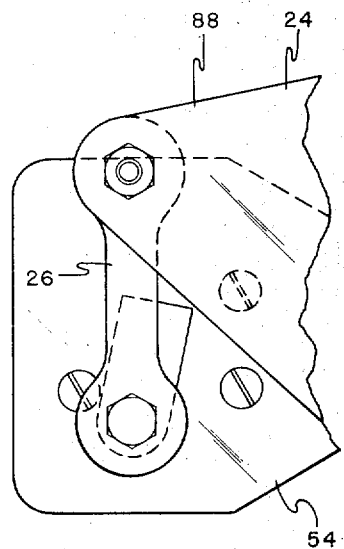
FIG. 2 is a fragmentary bottom plan view of the crank provided by the invention for developing oscillatory movement of the device.

Referring now in further detail to FIGS. 1 and 2, transit 12 is conventional in the sense that it includes a tripod support having legs (not shown) of the conventional telescoping type affixed to a base plate 32 (FIG. 4) by leg brackets 34 (FIG. 1).

A central support column 38 (FIG. 4) extends upwardly from base plate 32 and has affixed to its upper end head 14. Head 14 provides the primary support for laser generator 20 and includes a bearing mechanism 35 connected to the upper shaft portion 37 of column 38 by a retainer 42. This provides relative rotation between head 14 and column 38. Head 14 is adjustably interconnected to disc plate 36 by four leveling screws 40 which provide a mechanism (conventional in the art) for fine adjustment in leveling head 14. Disc 36 is seated on plate 32. Head 14 when released will rotate about column 38 to permit adjustment. In this fashion, the entire scope and generator mechanism is movable to select the radial direction of the laser beam.

Support column 38 extends upwardly through head 14 into support bracket 16. Thus, support bracket 16 will rotate in a generally horizontal plane jointly with head 14. A horizontal lock lever 44 (FIG. 1) extends through support bracket 16 for engagement with the upper end 37 of support column 38 and in one position locks head 14 relative to column 38 to prevent relative rotation therebetween. In a second position lever 44 permits free rotation of the apparatus 10 about column 38 to select the general radial direction of scope 18 and 20. When in a locked position, very fine horizontal circle control adjustment is provided by a control knob 46 (FIG. 1) with a vernier horizontal arcuate adjustment. Thus, the primary directional position is achieved by moving the lock lever 44 into a released position so that free horizontal positioning of laser generator 20 is permitted. Lever 44 is then moved into the lock position and fine adjustment is provided by sighting through the cross-hairs of scope 18 and manipulating control knob 46 accordingly.

Bracket 16 (FIG. 4) has a central portion 48 which is mounted to the upper portion 37 of column 38. A transit level 50 whose vial 52 is fully exposed for easy reading is affixed to the upper side of mid portion 48 of bracket 16 just beneath scope 18. The scope support is leveled by adjusting leveling screws 40 until the bubble within vial 52 of level 50 is centered uniformly when the laser generator 20 is rotated in all directions. It is important that the support structure for the fanning device be level in all directions so that a true datum plane of light is achieved in accordance with the oscillating apparatus provided by the invention.

Figure 4:
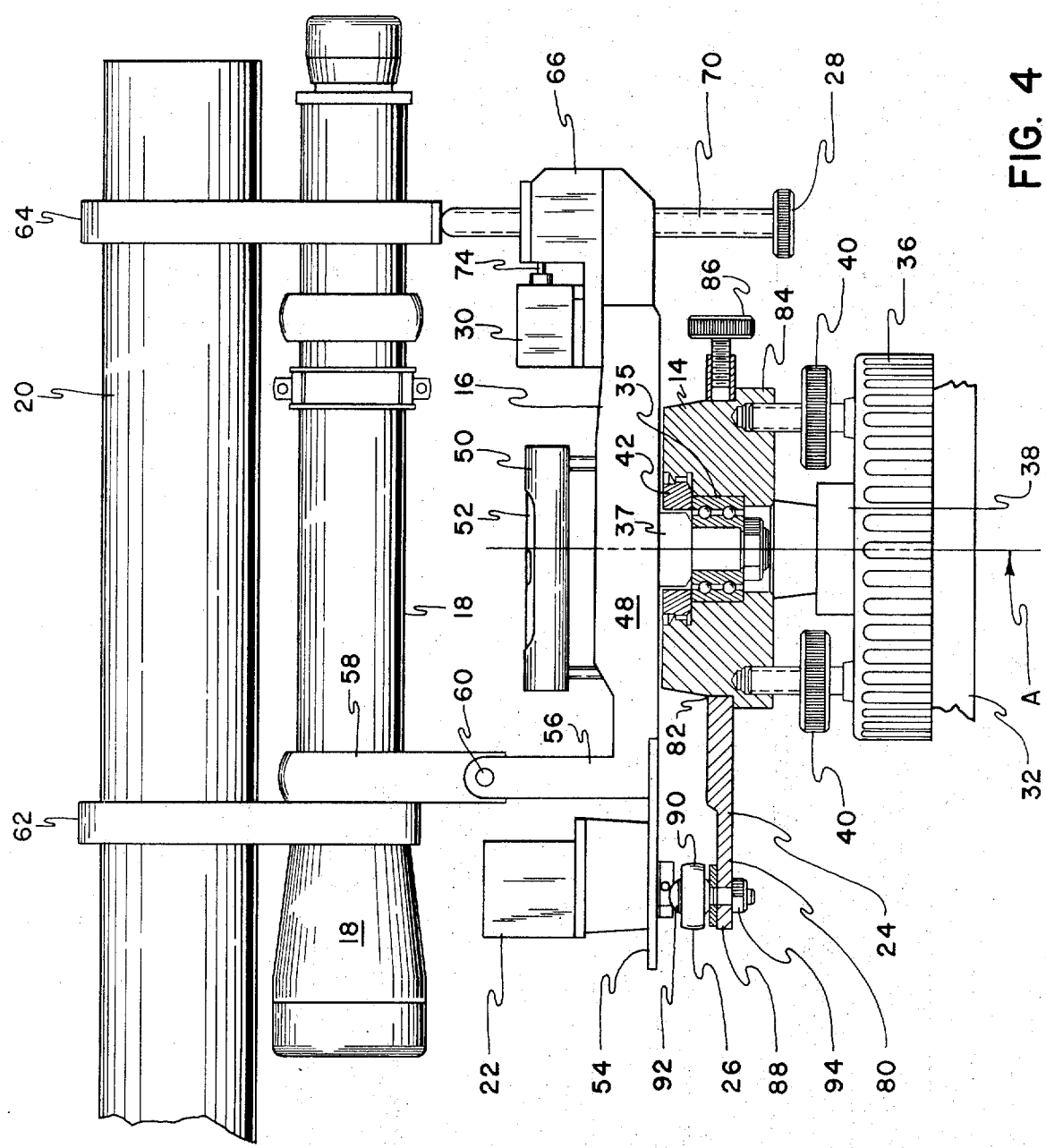
FIG. 4 is a fragmentary, elevational, partially cross-sectioned view of the laser fanning device from the opposite side as shown in FIG. 1.

The front end of bracket 16 includes a relatively flat support plate 54 on which is mounted a small electric motor 22. The drive shaft (not shown) of motor 22 extends downwardly through plate 54 for connection to a drive arm 98 which is connected to a crank 26 as will be described in more detail hereinafter. Extending upwardly from bracket 16 is a generally U-shaped bracket 56 to which is pivotally mounted a collar 58 which fits over scope 18 thereby supporting scope 18 to mounting bracket 16 while at the same time permitting pivotal movement of scope 18 and laser generator 20 about a horizontal axis relative to bracket 16. This is achieved by interconnecting collar 58 to bracket 56 by a pin 60 (FIG. 4). Laser generator 20 is rigidly connected to scope 18 by a pair of collars 62 and 64 which holds scope 18 and generator 20 in a vertically spaced axially aligned relationship.

The rearward end of support bracket 16 includes a housing 66 through which is mounted a vertically oriented tilt mechanism control rod 70. Rod 70 is threaded through housing 66 and has a control knob 28 connected to its lowermost end to permit manual turning of rod 70. Rotational movement of rod 70 provides axial displacement of the rod relative to housing 66. The lower portion of collar 64 seats against the upper end of rod 70 and is continuously urged against the rod since the center of gravity of the scope and generator lies well behind pivot pin 60. Thus, axial displacement of rod 70 in a vertical direction causes angular rotation of generator 20 about pin 60 for grade adjustment.

A digital counter 30 is mounted on support bracket 16 immediately adjacent housing 66. Counter 30 has a watch face 72 permitting visual reading of the digits therein. The digits are actuated by a stem 74 interconnected to rod 70 such that rotation of rod 70 imparts a corresponding movement of stem 74 to alter the digital read-out of counter 30. By proper selection of the ratio of digital movement within counter 30 relative to the movement of rod 70, an extremely accurate grade read-out can be achieved. This is extremely advantageous in making quick and simple grade adjustments as required.

Referring back to FIG. 1, a conventional scope 18 is shown having a control knob 76 providing quick and sharp focusing of the transit scope. Scope 18 provides the means for initial sighting of the laser beam toward the intended target. The laser generator itself is preferably waterproof and comprised of an aluminum-encased, helium neon laser tube. The laser tube is excited electronically by a 12 volt power source (not shown). This permits the utilization of a standard storage battery to enhance the portability of the entire mechanism.

As noted earlier, the oscillatory movement of laser generator 20 is provided by an electric motor 22 likewise preferably driven by the same 12 volt power source used to excite the generator. As shown in FIG. 1, electric motor 22 is conveniently turned "on" or "off" by switch 78.

To achieve the oscillatory motion, a special mounting plate 24 is secured to transit head 14. As illustrated in the drawings, plate 24 includes a relatively large opening 82 to permit the plate to slip over head 14. The base of head 14 includes an annular flange 84 which has a diameter larger than opening 82 such that plate 24 will seat upon the upper surface of flange 84. Opening 82 is preferably sized to fit snugly against the outer walls of head 14 although a slight clearance is necessary to permit plate 24 to be positioned in any desired arcuate configuration relative to head 14. Plate 24 is secured to head 14 by a thumbscrew 86 (FIG. 4) which is threaded through plate 24 for abutment against transit head 14 to lock plate 24 in any particular selected arcuate position relative to head 14. Thus, when thumbscrew 86 is released, plate 24 is free to rotate with head 14 about column 38. However, when thumbscrew 86 is tightened, head 14 and plate 24 are locked to column 38. Once thumbscrew 86 is tightened, the oscillating mechanism is engaged so that actuation of motor 22 will rotate bracket 16 relative to plate 24 as will be described shortly.

Figure 3:
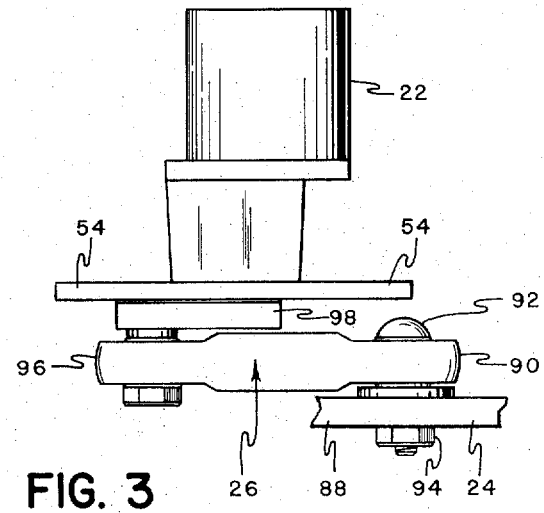
FIG. 3 is a fragmentary, side elevation view of the crank and electric motor for operating same.

Plate 24 has an overall tapered oblong configuration with opening 82 being positioned eccentrically therein such that plate 24 defines a general arm-like extension 88 from transit head 14. In the normal situation, arm portion 88 extends generally in the direction of the front end of support bracket 16 such that it is aligned beneath or at least a portion thereof is aligned beneath plate 54 of bracket 16. Arm 88 (FIGS. 2 and 3) is positioned in a vertically spaced relationship beneath plate 54 to permit interconnection between arm 88 and the drive portion of motor 22.

A crank 26 is connected at one end 90 to plate 24 by a threaded bolt 92 and nut 94. A bearing within end 90 of crank 26 permits rotational movement of crank 26 relative to arm 88 in a plane parallel to the arm. The other end 96 of crank 26 is similarily connected for pivotal rotation to one end of a drive arm 98 which is driven rotationally at its other end by the drive shaft of motor 22. Arm 98 is substantially shorter than crank 26. Since plate 24 is rigidly interconnected to transit head 14, while support bracket 16 which is mounted to laser generator 20 is free to rotate relative thereto, it will be appreciated that operation of motor 22 provides 360° rotation of drive arm 98 which develops an oscillatory motion of crank 26 through an angle less than 90° since as noted, drive arm 98 is substantially shorter than crank 24. The resultant movement is an oscillatory motion of laser generator 20, transit scope 18 and support bracket 16 to which is mounted electric motor 22. Thus, the electric motor causes its own arcuate movement jointly with the scope and laser generator.

The motion is that of a scanner sweeping rapidly through an arc which develops a datum plane of light from laser generator 20. The magnitude of arcuate oscillatory movement of the fanning device depends on the radial alignment between arm 88 and plate 54. Generally the lateral movement of the laser beam about the vertical axis has a minimum angle of 15° and less than 90° in accordance with the utilization of this type of fanning device in digging trenches and laying sewer pipe. It will be appreciated however that the angle of scan is determinitive by the parameters of the crank and mounting plate configuration. It should also be appreciated that the drive shaft of motor 22 could by an eccentric mechanism provide equivalent movement of the generator. Preferably, the motor speed is adjustable to provide selection of oscillations per minute. One advantage of this particular embodiment is that the entire transit head etc. is not rotated and hence a relatively low torque, inexpensive motor can be utilized.

OPERATION

Having described the apparatus in detail, its operation should be obvious. With the apparatus mounted on a tripod, the initial step is to level the transit support structure by the use of leveling screws 40 and transit level 50. Once the support structure is level, the next step is to aim the scope toward a target. Thumbscrew 86 must be released to permit rotation of head 14 and the scope about column 38. Once the general direction is achieved, lever 44 is moved to the right from the position shown in FIG. 1 to secure the scope in the selected position. However, vernier rotational adjustment is permitted by turning knob 46. Once the desired position is selected, lever 44 is returned to permit movement of bracket 16 relative to plate 24 at which time thumbscrew 86 is tightened to prevent further rotation of head 14 and plate 24. With the laser generator excited, actuation of motor 22 will cause bracket 16 to oscillate rotationally relative to plate 24. The resultant oscillation of the laser generator will project and develop a datum plane of light. It will be appreciated that prior to this, the grade adjustment is made by turning thumbscrew 28 until the desired grade read-out is shown in digital counter 30.

It will be appreciated that various target devices can be utilized with the invention. A preferred target and sensor is described by applicants in a copending application filed jointly herewith entitled LIGHT TARGET AND SENSOR Ser. No. 225,894 filed Feb. 14, 1972.

The present invention provides a simple efficient device which results in a substantial savings of valuable time, labor and guess work. It completely eliminates hit-and-miss grade control and time consuming work with the obsolete string and bar target system. A particular advantage is the cost of the overall system and the provision of a device that is adaptable to all types of surveying equipment.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. Apparatus for generating light in a plane comprising, in combination: support means; first and second mounting means rotatably mounted to said support means and interconnected to each other for relative rotation about an axis; a highly collimated light beam generator mounted on said first mounting means for projecting a highly collimated light beam or an axis extending in a generally horizontal direction; line-of-sight means mounted on said first mounting means and cooperatively associated with said generator for visually sighting said generator along or parallel to the light projection axis; an electric motor mounted on one of said first and second mounting means, said motor being interconnected to the other of said mounting means by a crank means whereby actuation of said motor causes rapid rotational movement of said first mounting means, generator and light beam back and forth to produce and develop a datum plane of light.

2. The apparatus of claim 1 wherein the axis of rotation of said electric motor and crank means is parallel and offset laterally from the axis of rotation of said light beam generator.

3. The apparatus of claim 1 wherein said light beam generator is mounted on said first mounting means for pivotal movement about a generally horizontal axis and includes a grade adjustment means for selecting the grade of the light beam generated by said source.

4. The apparatus of claim 3 wherein said grade adjustment means includes a threadable control screw threadable through said first mounting means into abutment with said light beam generator to provide facile adjustment of the grade of said generator.

5. The apparatus of claim 4 wherein said apparatus further includes means for visually indicating the grade angle and increments in adjustment of the grade angle of said light beam generator.

6. The apparatus of claim 5 wherein said last mentioned means is comprised of a digital counter mounted on said first mounting means and interconnected by a stem to said threaded control screw whereby movement of said control screw provides corresponding movement of said counter stem to actuate said counter.

7. The apparatus of claim 1 wherein said highly collimated light beam generator is a laser generator and said light beam is a laser beam.

8. Apparatus for generating light in a plane comprising, in combination: first and second mounting means interconnected to each other for relative rotation about an axis; a highly collimated light beam generator mounted on said first mounting means for projecting an intensified light beam in a generally horizontal direction; an electric motor mounted on said first mounting means and interconnected to said second mounting means by a crank means whereby actuation of said motor causes rapid rotational movement of said light beam back and forth to produce and develop a datum plane of light, said second mounting means including arm means extending radially therefrom, said arm means being interconnected to said electric motor by said crank means such that operation of said motor causes said light beam generator, first mounting means and electric motor to oscillate rotationally relative to said second mounting means to produce and develop said plane of light.

9. The apparatus of claim 8 wherein said rotation laterally of said axis is less than 360°.

10. Apparatus for generating a datum plane of light comprising, in combination: a support; a first support bracket rotatable mounted on said support about a first axis; a second support bracket mounted for rotatable adjustment on said support about said first axis; means for fixing said second support bracket to said support at different rotatable positions; a crank means rotatably interconnected to said first and second support brackets, said first bracket being rotatable by said crank means about said first axis; a highly collimated light beam generator mounted on said first support bracket for rotation about said first axis for projecting a highly collimated light beam in a plane generally perpendicular to said first axis; and an electric motor mounted on one of said first and second support brackets, said motor being interconnected to and driving said crank means whereby actuation of said motor causes rapid rotational movement of said first support bracket and generator back and forth to produce and develop said datum plane of light.

11. The apparatus of claim 10 wherein said apparatus further includes means for mounting said generator on said first support bracket to provide rotation about a generally horizontal axis; and grade adjustment means for manually adjusting the pitch of said generator to adjust the grade of said light beam.

12. The apparatus of claim 11 wherein said apparatus further includes read-out means connected to said grade adjustment means to permit visual reading of the grade of said light beam.

13. Apparatus for generating a datum plane of light comprising, in combination: a light generator for projecting a highly collimated beam of light; a transit scope having a line-of-sight parallel to the light projection axis, said transit scope and generator being interconnected and mounted on a first mounting means, said first mounting means being rotatably mounted on a second mounting means for rotation relative thereto about an axis of rotation; means for leveling said transit scope and generator; and means for oscillating said transit scope and generator in a reciprocal path about said rotational axis to develop a plane of light.

14. The combination according to claim 13 wherein said axis of rotation is generally perpendicular to the line-of-sight of said scope and projection axis of said generator.

15. The combination according to claim 14 wherein said means for oscillating said transit scope and generator includes an electric motor mounted on one of said first and second mounting means, said motor being interconnected to the other of said mounting means by a crank means whereby actuation of said motor causes rapid rotational movement of said light beam back and forth to produce and develop a datum plane of light.

16. The combination according to claim 15 wherein the axes of rotation of said electric motor and crank means is generally parallel to and offset from said axis of rotation of said transit scope and generator.

17. The combination according to claim 13 wherein means are provided for rotating said transit scope and generator about a second axis generally perpendicular to said axis of rotation to provide a means for adjusting the grade of projection of said light beam.

18. The combination according to claim 17 wherein said second axis of rotation is offset from said axis of rotation.

19. The combination according to claim 18 wherein said grade adjustment means includes a threadable control screw threadable through said first mounting means into abutment with one of said transit scope and generator to provide facile adjustment of the grade of said generator.

20. The combination according to claim 19 wherein said apparatus further includes means for visually indicating the grade angle and increments in adjustments of the grade angle of said light beam projection.

21. The combination according to claim 20 wherein said means for visually indicating the grade angle is comprised of a digital counter mounted on said first mounting means and interconnected by a stem to said threaded control screw whereby movement of said control screw provides corresponding movement of said counter stem to actuate said counter.

22. Apparatus for generating light in a plane comprising, in combination: first and second support means; a highly collimated light beam generator mounted on said first support means for projecting a highly collimated light beam in a generally horizontal direction; said first support means being rotatably interconnected to said second support means by a crank means for rotation relative said second support means about a first generally vertical axis; said crank means comprising a first and second crank arm, said first crank arm being rotatably connected at one end to said second support means and rotatably connected at the other end to one end of said second crank arm; an electric motor mounted to said first support means and having a drive shaft rotatable about a second generally vertical axis spaced from said first axis; said drive shaft being connected to the other end of said second crank arm whereby actuation of said motor causes rapid joint movement of said first support means, electric motor and light beam generator back and forth to produce and develop a datum plane of light.

23. The apparatus according to claim 22 wherein the rotation of said first crank arm about each of its ends is about generally third and fourth vertical axes spaced from each other and said first and second spaced axes.

* * * * *

UNITED STATES PATENT OFFICE
CERTIFICATE OF CORRECTION

Patent No. 3,823,313　　　　　　　　Dated July 9, 1974

Inventor(s) Norman P. Unema

It is certified that error appears in the above-identified patent and that said Letters Patent are hereby corrected as shown below:

Column 6, line 21;
　　　Delete "along or".

Signed and sealed this 5th day of November 1974.

(SEAL)
Attest:

McCOY M. GIBSON JR.　　　　　　　　C. MARSHALL DANN
Attesting Officer　　　　　　　　　Commissioner of Patents